US012231871B2

(12) United States Patent
Laaksonen et al.

(10) Patent No.: US 12,231,871 B2
(45) Date of Patent: Feb. 18, 2025

(54) SPATIAL AUDIO SERVICE

(71) Applicant: NOKIA TECHNOLOGIES OY, Espoo (FI)

(72) Inventors: Lasse Juhani Laaksonen, Tampere (FI); Arto Juhani Lehtiniemi, Lempäälä (FI); Antti Johannes Eronen, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 226 days.

(21) Appl. No.: 18/150,613

(22) Filed: Jan. 5, 2023

(65) Prior Publication Data

US 2023/0217207 A1 Jul. 6, 2023

(30) Foreign Application Priority Data

Jan. 5, 2022 (EP) .................................... 22150286

(51) Int. Cl.
*H04S 7/00* (2006.01)

(52) U.S. Cl.
CPC ........... *H04S 7/304* (2013.01); *H04S 2420/11* (2013.01)

(58) Field of Classification Search
None
See application file for complete search history.

(56) References Cited

U.S. PATENT DOCUMENTS

| | | | |
|---|---|---|---|
| 2002/0150256 A1 | 10/2002 | Belrose et al. |
| 2019/0149919 A1 | 5/2019 | Mate et al. |
| 2019/0313200 A1 | 10/2019 | Stein |
| 2020/0236489 A1 | 7/2020 | Merimaa et al. |

OTHER PUBLICATIONS

Apple, Inc., "AirPods Pro and AirPods Max Active Noise Cancellation and Transparency Mode", Retrieved via the Wayback Machine on Sep. 28, 2023, <URL:https://web.archive.org/web/20211208172608/https://support.apple.com/en-us/HT210643>, (May 21, 2021), 5 pages.
Extended European Search Report for European Application No. 22150286.7 dated Oct. 5, 2022, 8 pages.

*Primary Examiner* — Kenny H Truong
(74) *Attorney, Agent, or Firm* — ALSTON & BIRD LLP

(57) ABSTRACT

A method, apparatus and computer program are provided for assessing a continuity of audio service by comparing a previous audio service with a first spatial audio service that uses user head-tracking and a second audio service to identify which of the first or second spatial audio service provides a continuity of audio service with respect to the previous audio service. If the first or second spatial audio service is assessed to provide continuity of audio service, the respective spatial audio service is selectively enabled. The first spatial audio service controls or sets at least one directional property of at least one sound source and the first spatial audio service is assessed to provide continuity of audio service if it can use head-tracking to control or set the at least one directional property of at least one sound source.

20 Claims, 8 Drawing Sheets

SPATIAL AUDIO SERVICE

CROSS-REFERENCE TO RELATED APPLICATIONS

This application claims priority to European Patent Application No. 22150286.7, filed Jan. 5, 2022, the entire contents of which are incorporated herein by reference.

TECHNOLOGICAL FIELD

Embodiments of the present disclosure relate to spatial audio service. Some relate to spatial audio service with user head-tracking.

BACKGROUND

Spatial audio describes the rendering of sound sources at different controllable directions relative to a user. The user can therefore hear the sound sources as if they are arriving from different directions. A spatial audio service controls or sets at least one directional property of at least one sound source. The directional properties are properties that can be defined independently for different directions and can for example include relative intensity of the sound source, size of the sound source, distance of the sound source, or audio characteristics of the sound source such as reverberation, spectral filtering etc.

Various audio formats can be used for spatial audio. Examples include multi-channel mixes (e.g., 5.1, 7.1+4), Ambisonics (FOA/HOA), parametric spatial audio (e.g., Metadata-assisted spatial audio—MASA, which has been proposed in context of 3GPP IVAS codec standardization), object-based audio, and any suitable combinations thereof.

In some examples, spatial audio is rendered to a user via a headset. The rendered sound sources can be positioned relative to the real-world or positioned relative to the headset. Positioning of sound sources relative to the headset, does not require any tracking of movement of the headset. Positioning of sound sources relative to the real-world does require tracking of movement of the headset. If a point of view defined for the headset rotates to the right, then the sound scene comprising the sound sources needs to rotate to the left so that it remains fixed in the real-world.

The point of view can be defined by orientation or by orientation and location. Where the point of view is defined by three-dimensional orientation it is described as 3DoF (three degrees of freedom). Where the point of view is defined by three-dimensional orientation and by three-dimensional location it is described as 6DoF (six degrees of freedom). Where the point of view is defined by three-dimensional orientation and by only limited movement such as leaning, it is described as 3DoF+ (three degrees of freedom plus).

Thus, without head-tracking a sound scene remains fixed to the user's head when the user rotates their head, and with head-tracking the sound scene rotates relative to user's head when user rotates their head in a direction opposite to the user's head rotation so that sound sources appear fixed in space.

Not all audio services are spatial audio services. For example, an audio service can provide monophonic audio or stereo audio.

BRIEF SUMMARY

According to various, but not necessarily all, embodiments there is provided an apparatus comprising means for:

enabling any one of a plurality of audio services, the plurality of audio services comprising:

a first spatial audio service that uses user head-tracking;

a second audio service; assessing a continuity of audio service by comparing a previous audio service with the first spatial audio service and the second audio service to identify which of the first spatial audio service and the second audio services provides a continuity of audio service with respect to the previous audio service;

selectively enabling the first spatial audio service if it is assessed to provide continuity of audio service;

selectively enabling the second audio service if it is assessed to provide continuity of audio service, wherein the first spatial audio service controls or sets at least one directional property of at least one sound source and wherein the first spatial audio service is assessed to provide continuity of audio service if it can use head-tracking to control or set the at least one directional property of at least one sound source, such that at least one directional property of at least one sound source rendered by the previous audio service is reproduced by the first spatial audio service using head-tracking.

In some but not necessarily all examples, the previous audio service is a spatial audio service that uses head-tracking to control or set at least one directional property of at least one sound source and the first spatial audio service is assessed to provide continuity of audio service if it can use head-tracking to control or set the at least one directional property of the at least one sound source such that the at least one directional property of the at least one sound source can be reproduced by the first spatial audio service using head-tracking.

In some but not necessarily all examples, continuity of service is assessed to exist between the previous audio service and the first audio service when the previous audio service uses user head-tracking to render real-world-fixed sound sources and the first audio service uses user head-tracking to render real-world-fixed sound sources.

In some but not necessarily all examples, the previous audio service uses user head-tracking to render real-world-fixed sound sources via a headset and the first audio service uses user head-tracking to render real-world-fixed sound sources not via a headset.

In some but not necessarily all examples, the previous audio service is a spatial audio service that uses head-tracking to control or set at least one directional property of at least one sound source and the first spatial audio service is assessed to provide continuity of audio service if it can use head-tracking to control or set the at least one directional property of the at least one sound source, wherein the at least one directional property of the at least one sound source can be recalibrated and subsequently reproduced by the first spatial audio service using head-tracking.

In some but not necessarily all examples, the previous audio service is not a spatial audio service that does not use head-tracking and has a fixed directional property of at least one sound source and the first spatial audio service is assessed to provide continuity of audio service if it can use head-tracking to control or set at least one directional property of the at least one sound source, wherein the fixed directional property of the at least one sound source can be reproduced by the first spatial audio service using head-tracking.

In some but not necessarily all examples, continuity of service is assessed to exist between the previous audio service and the first audio service when the previous audio service renders head-fixed sound sources and the first audio service uses user head-tracking to render head-fixed sound sources.

In some but not necessarily all examples, the previous audio service uses user head-tracking to render head-fixed sound sources via a headset and the first audio service uses user head-tracking to render head-fixed sound sources not via a headset.

In some but not necessarily all examples, continuity of service exists between the previous audio service and the first audio service when the previous audio service uses a first user head-tracking device and the first audio service uses the same first user head-tracking device.

In some but not necessarily all examples, the first head-tracking device is comprised in or uses a headset.

In some but not necessarily all examples, the first audio service and the second audio service use different audio output devices, one of which is a headset and the other one of which is not a headset.

In some but not necessarily all examples, the first audio service comprises dynamic maintenance, or static set-up of:

audio focus or beamforming;

sound source width control;

ANC/passthrough with head-tracking;

spatial audio dependent on user head-tracked point-of-view.

In some but not necessarily all examples, the first audio service and/or the second audio service require one or more of: use of a headset, use of a headset for audio output, use of external speakers for audio output, use of a headset for head-tracking, performance of head-tracking without a headset.

According to various, but not necessarily all, embodiments there is provided a method comprising:

assessing a continuity of audio service by comparing a previous audio service with a first spatial audio service that uses user head-tracking and a second audio service to identify which of the first spatial audio service and the second audio services provides a continuity of audio service with respect to the previous audio service;

selectively enabling the first spatial audio service if it is assessed to provide continuity of audio service;

selectively enabling the second audio service if it is assessed to provide continuity of audio service, wherein the first spatial audio service controls or sets at least one directional property of at least one sound source and wherein the first spatial audio service is assessed to provide continuity of audio service if it can use head-tracking to control or set the at least one directional property of at least one sound source, such that at least one directional property of at least one sound source rendered by the previous audio service is reproduced by the first spatial audio service using head-tracking.

According to various, but not necessarily all, embodiments there is provided a computer program that when run on one or more processors of an apparatus causes the apparatus to perform:

assessing a continuity of audio service by comparing a previous audio service with a first spatial audio service that uses user head-tracking and a second audio service to identify which of the first spatial audio service and the second audio services provides a continuity of audio service with respect to the previous audio service;

selectively enabling the first spatial audio service if it is assessed to provide continuity of audio service;

selectively enabling the second audio service if it is assessed to provide continuity of audio service, wherein the first spatial audio service controls or sets at least one directional property of at least one sound source and wherein the first spatial audio service is assessed to provide continuity of audio service if it can use head-tracking to control or set the at least one directional property of at least one sound source, such that at least one directional property of at least one sound source rendered by the previous audio service is reproduced by the first spatial audio service using head-tracking.

According to various, but not necessarily all, embodiments there is provided examples as claimed in the appended claims.

BRIEF DESCRIPTION

Some examples will now be described with reference to the accompanying drawings in which.

DEFINITIONS

"sound space" (or "virtual sound space") refers to an arrangement of sound sources in a three-dimensional space.

"sound scene" refers to a representation of the sound space listened to from a particular virtual point of view within the sound space.

"Virtual point of view" is a position within a sound space. It may be defined using a virtual location and/or a virtual orientation. It may be considered to be a movable 'point of view'.

"real space" (or "physical space") refers to a real environment, which may be three dimensional.

"Real point of view" is a position within a real space. It may be defined using a location and/or a orientation. It may be considered to be a movable 'point of view'.

"rendering" means providing in a form that is perceived by the user

"head-tracking" refers to tracking a user's real point of view (location and/or orientation). The tracked user's real point of view can be used to determine the virtual point of view within the virtual space and this in turn determines the sound scene rendered to the user.

Three degrees of freedom (3DoF) describes where the virtual point of view is determined by orientation only (e.g. the three degrees of three-dimensional orientation).

Six degrees of freedom (6DoF) describes where the virtual position is determined by both orientation (e.g. the three degrees of three-dimensional orientation) and location (e.g. the three degrees of three-dimensional location).

Three degrees of freedom plus (3DoF+) describes where the virtual point of view is determined by orientation and by small changes in location caused, for example, by leaning.

DETAILED DESCRIPTION

Figure 1A:
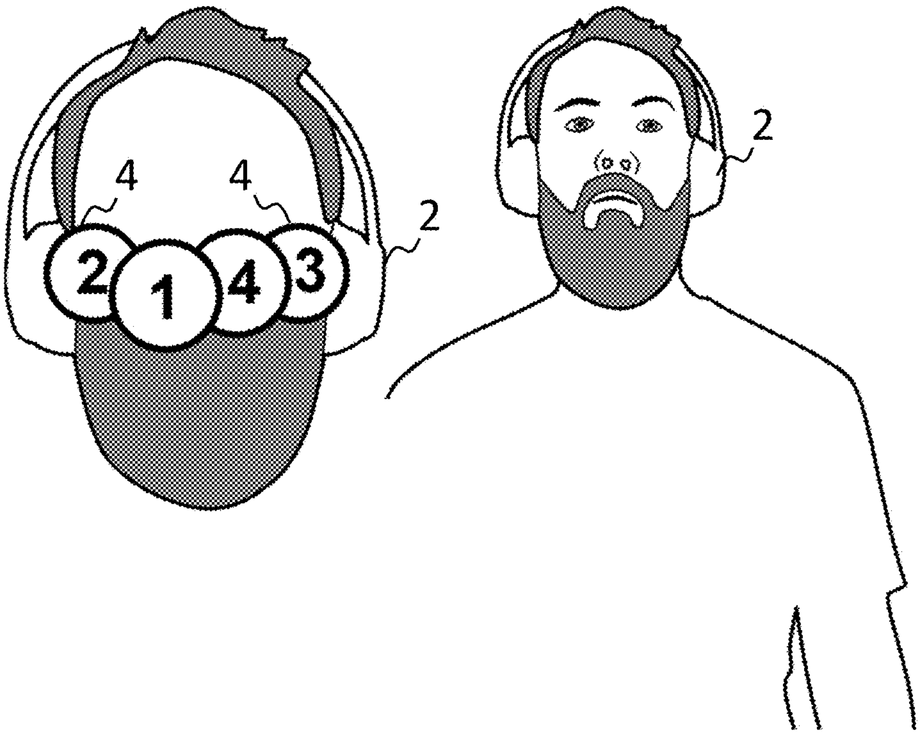
FIG. 1A and 1B shows example of audio services, FIG. 1B illustrating an example of a spatial audio service.

FIG. 1A illustrates an example of an audio service. In this example, the audio service is not a spatial audio service. The sound sources 4 are rendered as monophonic or stereo audio within the head-space of the user. The sound sources 4 are not rendered from different controllable directions relative to a user. The user cannot hear the sound sources 4 as if they are arriving from different directions.

Figure 1B:
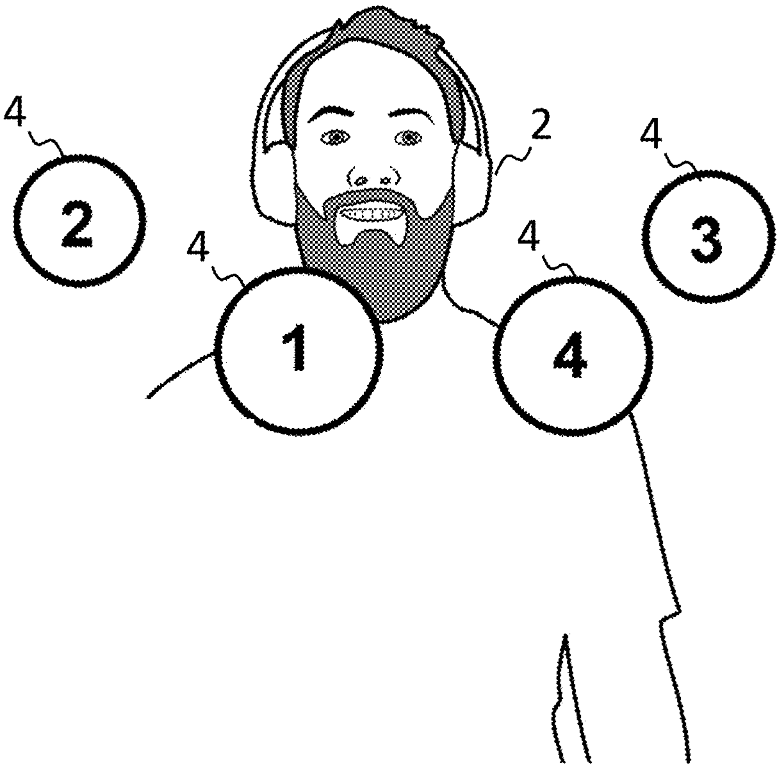

FIG. 1B illustrates another example of an audio service. In this example, the audio service is a spatial audio service. The sound sources 4 are rendered as externalized sound sources outside the head-space of the user. The sound sources 4 are rendered from different controllable directions relative to a user. The user can hear the sound sources 4 as if they are arriving from different directions.

Spatial audio describes the rendering of sound sources 4 at different controllable directions relative to a user. The user can therefore hear the sound sources 4 as if they are arriving from different directions. A spatial audio service controls or sets at least one directional property of at least one sound source 4.

A directional property is a rendered property of a sound source 4 that is directionally dependent or directionally variable. A directional property can be defined independently for different directions. The directional property can therefore be different for different directions and the property is a property of the rendered sound source 4. The rendered property can comprise one or more of: relative intensity of the sound source 4, size of the sound source 4 (width and/or height), distance of the sound source 4 from the user, or audio characteristics of the sound source 4 such as reverberation, spectral filtering etc. The direction can be defined by a bearing or a position relative to an origin Various audio formats can be used for spatial audio. Examples include multi-channel mixes (e.g., 5.1, 7.1+4), Ambisonics (FOA/HOA), parametric spatial audio (e.g., Metadata-assisted spatial audio—MASA, which has been proposed in context of 3GPP IVAS codec standardization), object-based audio, and any suitable combinations thereof.

The spatial audio service is provided by an audio rendering device 2. In this example the audio rendering device 2 is a binaural headset.

Figure 2A:
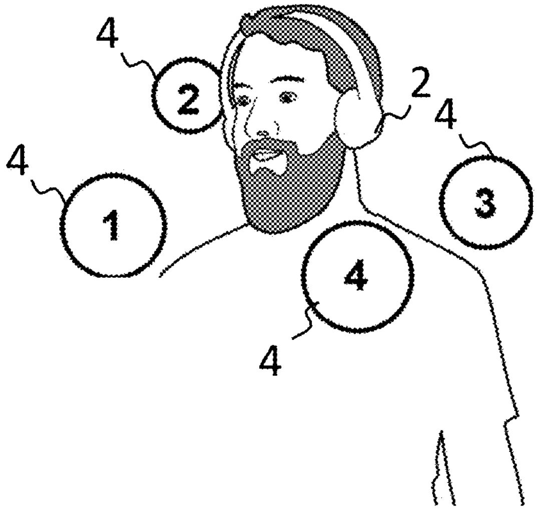
FIGS. 2A, 2B, 2C illustrate a spatial audio service without head-tracking.
Figure 2B:
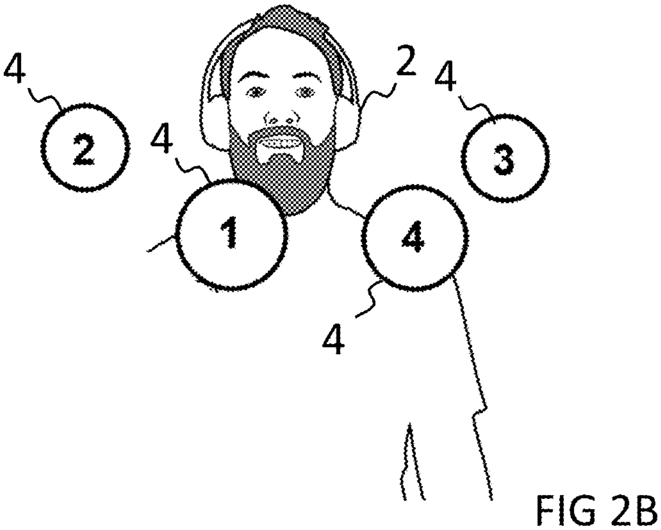
Figure 2C:
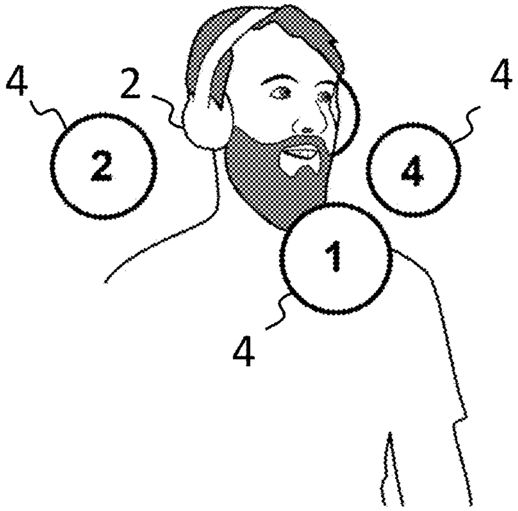

FIG. 2A, 2B, 2C illustrates a spatial audio service (as illustrated in FIG. 1B) as a user rotates their head from their right to their left, without head-tracking. The sound sources 4 have fixed positions relative to the headset 2. Without head-tracking, the sound scene remains fixed to the user's head when the user rotates their head.

In some circumstances it is not desirable to enable head-tracking. Spatial music is typically rendered without head-tracking even if this capability would be available on the headset 2.

Figure 3A:
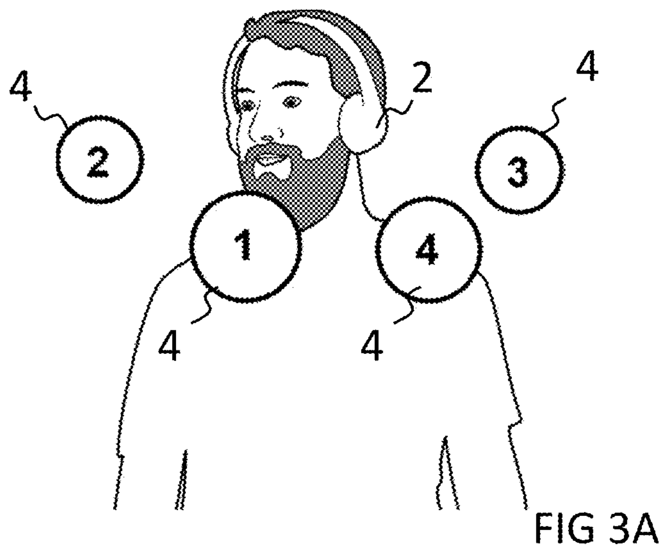
FIGS. 3A, 3B, 3C illustrate a spatial audio service with head-tracking.
Figure 3B:
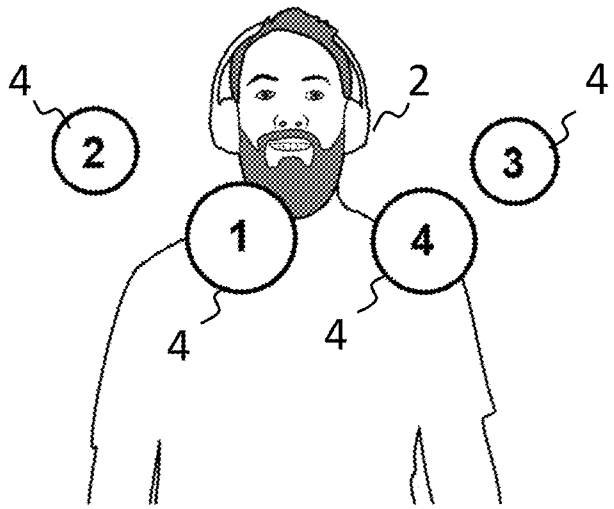
Figure 3C:
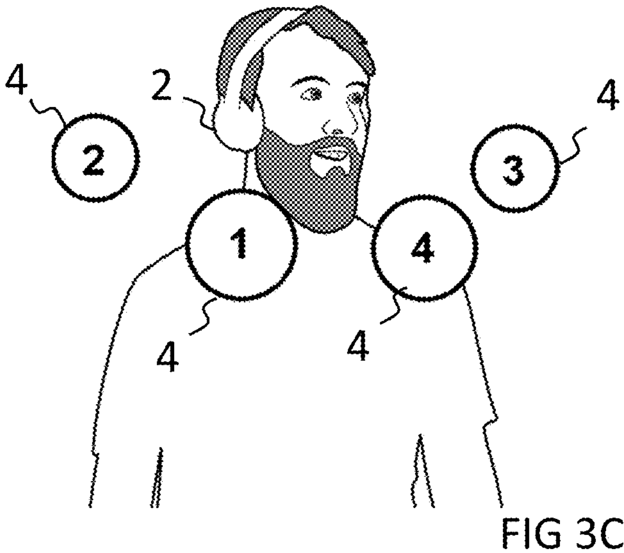

FIG. 3A, 3B, 3C illustrates a spatial audio service (as illustrated in FIG. 1B) as a user rotates their head from their right to their left, with head-tracking. The sound sources 4 have fixed positions relative to the real space and counter-rotate relative to the headset 2. With head-tracking, the sound scene remains fixed to the external real space when the user rotates their head.

As a point of view defined for the headset 2 rotates, then the sound scene comprising the sound sources 4 rotates relative to the headset 2 in the opposite direction so that the sound scene remains fixed in the real-world.

The point of view can be defined by orientation or by orientation and location. In can be 3DoF, 6DoF or 3DoF+.

In some circumstances it is desirable to enable head-tracking, because, for example, head-tracking enhances immersion by improving externalization of the sound sources 4. A user is also able to turn towards a sound source 4.

Different audio rendering device 2 can be used to provide an audio service and a spatial audio service.

Figure 4A:
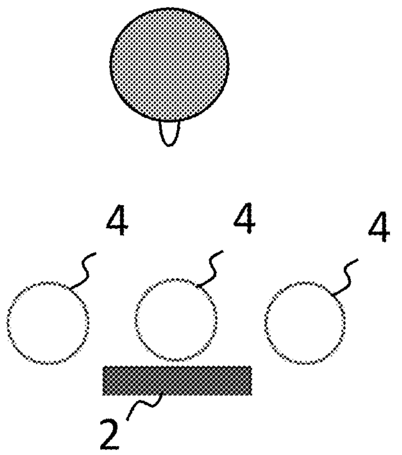
FIGS. 4A, 4B illustrate examples of audio rendering device.

FIG. 4A illustrates an example of an audio rendering device 2 that comprises external loudspeakers that renders sound into a real space occupied by a user. The externally rendered sound produces different sound sources 4. This type of audio rendering device 2 will be referred to as loudspeaker device.

Figure 4B:
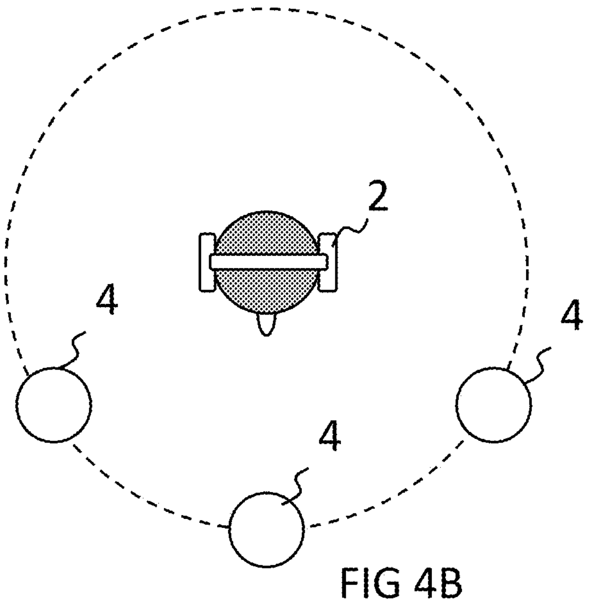

FIG. 4B illustrates an example of an audio rendering device 2 that comprises a headset that renders sound into the ears of a user. The user perceives external sound sources 4 as previously described.

A headset describes a device worn on or at the head. The headset may be a set of earphones or a set of ear buds for example.

In some circumstances a user will transition between different audio rendering devices 2. For example, a user may transition from using a loudspeaker device to using a headset or vice versa. Such transitions could create an undesirable audio discontinuity if an audio property enabled by one device is not enable by the other.

Figure 5A:
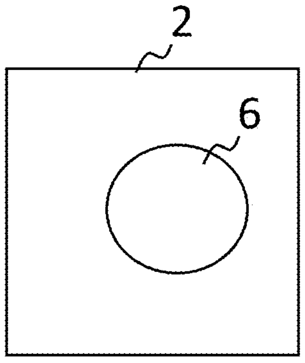
FIGS. 5A, 5B illustrate examples of head-tracking devices.
Figure 5B:
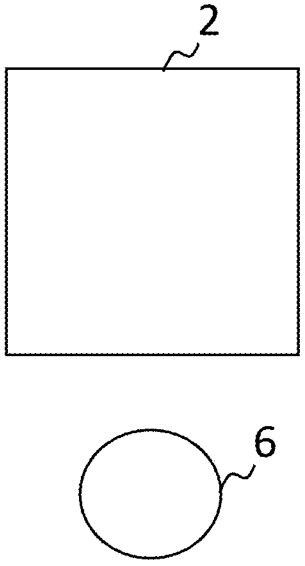

FIGS. 5A and 5B illustrate an example of a head-tracking device 6. In the example illustrated in FIG. 5A, the head-tracking device 6 is comprised in the audio rendering device 2. The head-tracking device 6 can be described as native to or integrated with the audio rendering device 2. In the example illustrated in FIG. 5B, the head-tracking device 6 is not comprised in the audio rendering device 2 but is separated from and distinct to the audio rendering device 2 although they may be in wired or wireless communication. The head-tracking device 6 cannot be described as native to or integrated with the audio rendering device 2.

There can be different types of head-tracking devices 6.

A native head-tracking device 6 to a headset 2 monitors motion of the head-tracking device. The head-tracking device 6 can comprise inertial motion sensors or other positional sensors.

A non-native head-tracking device 6 can monitor motion of the user's head. The head-tracking device can comprise a camera or other remote-sensing positional sensor.

In some circumstances a user will transition between different head-tracking devices when transition between different audio rendering devices 2. For example, a user may transition from using a device native to a headset to using a non-native device or vice versa. For example, there may be a transition from no head-tracking to using head-tracking. For example, there may be a transition from using head-tracking to not using head-tracking. For example, there may be a transition from using a first head-tracking device 6 to using a different second head-tracking device 6. The transition in head-tracking can create an undesirable spatial audio discontinuity. This could occur, for example, if an audio property enabled by head-tracking, e.g., audio beamforming, is lost due to loss of the head-tracking capability.

Figure 6:
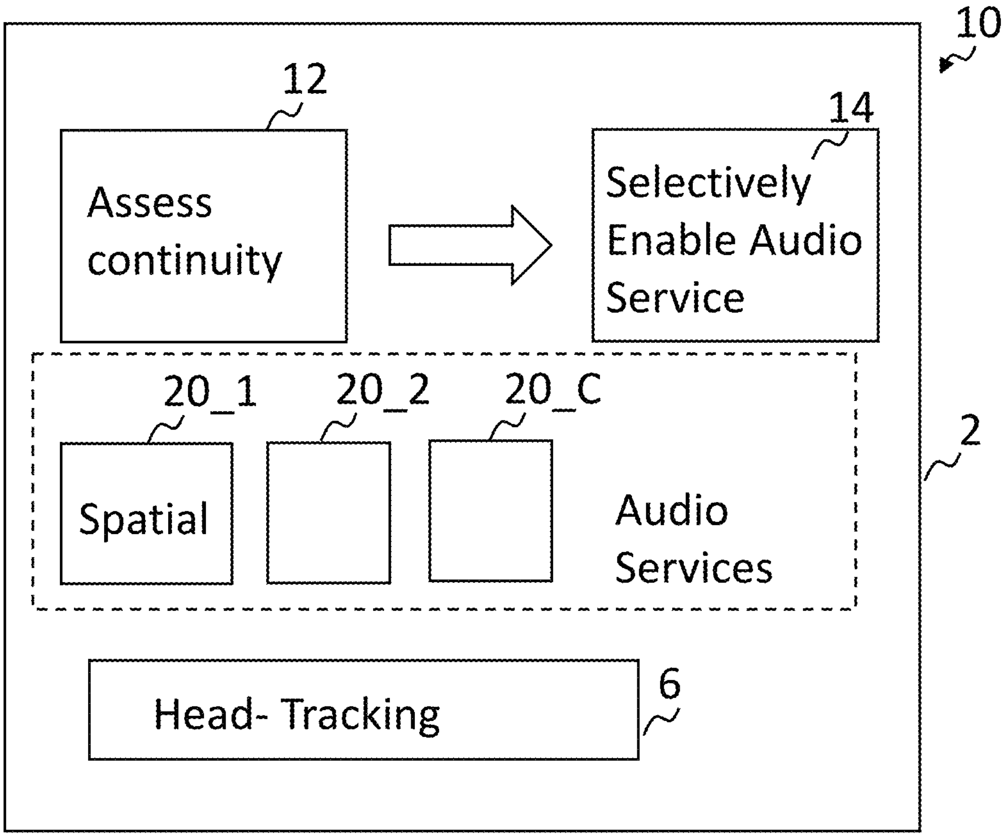
FIG. 6 illustrates an apparatus for assessing continuity of audio services and selectively enabling audio services.

FIG. 6 illustrates an example of an apparatus 10. The apparatus 10 is for selecting an audio service 20 for rendering by the audio rendering device 2. In some but not all examples, the apparatus 10 is also the audio rendering device 2. In other examples, the apparatus 10 is in communication with the audio rendering device 2.

The apparatus 10 is therefore configured to enable any one of a plurality of audio services 20. The plurality of audio services 20 comprise: a first spatial audio service 20_1 that uses user head-tracking and a second audio service 20_2. The second audio service 20_2 is different to the first audio service 20_1.

In some but not necessarily all example, the second audio service 20_2 is a spatial audio service.

The apparatus 10 comprises assessment means 12 configured to assess a continuity of audio service 20 by comparing a previous audio service 20_C with the first spatial audio service 20_1 and the second audio service 20_2 to identify which of the first spatial audio service 20_1 and the second audio service 20_2 provides a continuity of audio service 20 with respect to the previous audio service 20_C.

The previous audio service 20_C can, in some but not necessarily all examples, be the immediately previous audio service, that is the current audio service. The previous audio service 20_C can, in some circumstances, have been enabled by the apparatus 10, however, in other circumstances the previous audio service can be enabled by a different apparatus.

The apparatus 10 also comprises selection means 14 configured to selectively enable the first spatial audio service 20_1 if it is assessed to provide continuity of audio service and to selectively enable the second audio service 20_2 if it is assessed to provide continuity of audio service.

The first spatial audio service 20_1 controls or sets at least one directional property of at least one sound source 4 (not illustrated in FIG. 6). The directional properties have been previously described with reference to FIG. 1B.

The first spatial audio service 20_1 is assessed to provide continuity of audio service if it can use head-tracking to control or set the at least one directional property of the at least one sound source 4, such that at least one directional property of at least one sound source 4 rendered by the previous audio service 20_C is reproduced by the first spatial audio service 20_1 using head-tracking.

Reproduction of a directional property requires both the rendered property and the rendered direction to be reproduced.

In some but not necessarily all examples, the apparatus 10 is configured to have a default and is configured to selectively enable the second audio service 20_2 if it is assessed that the first audio service 20_1 does not provide continuity of audio service. In this example, the second audio service 20_2 can, for example, provide monophonic or stereo audio.

In some but not necessarily all examples, the previous audio service 20_C is a spatial audio service that uses head-tracking to control or set at least one directional property (e.g. audio focus) of at least one sound source 4 and the first spatial audio service 20_1 is assessed to provide continuity of audio service if it can use head-tracking to control or set the at least one directional property of the at least one sound source 4 such that the at least one directional property of the at least one sound source 4 can be reproduced by the first spatial audio service 20_1 using head-tracking. In at least some examples, the sound source 4 is a real-space fixed sound source 4. In at least some examples, the assessment and selection is triggered when the audio rendering device 2 is changed from being a headset.

Thus, in at least some examples, the continuity of service is assessed to exist between the previous audio service 20_C and the first audio service 20_1 when the previous audio service 20_C uses user head-tracking to render real-world-fixed sound sources 4 and the first audio service uses 20_1 user head-tracking to render real-world-fixed sound sources 4. In at least some of these examples, the previous audio service 20_C uses user head-tracking to render real-world-fixed sound sources 4 via a headset 2 and the first audio service 20_1 uses user head-tracking to render real-world-fixed sound sources not via a headset. The headset 2 can comprise a head-tracking device 6.

In other examples, the previous audio service 20_C is a spatial audio service that uses head-tracking to control or set at least one directional property of at least one sound source 4 and the first spatial audio service 20_1 is assessed to provide continuity of audio service if it can use head-tracking to control or set the at least one directional property of the at least one sound source 4 such that the at least one directional property of the at least one sound source 4 can be recalibrated and subsequently reproduced by the first spatial audio service 20_1 using head-tracking. The directional property can, for example, be the origin of the sound scene from which sound sources 4 are positioned. Without head tracking, the origin is fixed to the headset and with head-tracking the origin is fixed in real-space. In this example, the origin is repositioned by for example disabling head-tracking and allowing the position of the headset to define a new origin for the sound scene and then re-enable head-tracking.

In still other examples, the previous audio service 20_C does not use head-tracking and has a head-fixed property of at least one sound source 4 and the first spatial audio service is assessed to provide continuity of audio service if it can use head-tracking to control or set at least one directional property of the at least one sound source 4, such that the head-fixed property of the at least one sound source 4 can be reproduced by the first spatial audio service 20_1 using head-tracking. In some but not necessarily all examples, the continuity provides head fixed sound sources 4 when audio rendering device 2 is changed from being via a headset.

Thus in at least some examples, the continuity of service is assessed to exist between the previous audio service 20_C and the first audio service 20_1 when the previous audio service 20_C renders head-fixed sound sources 4 and the first audio service 20_1 uses user head-tracking to render head-fixed sound sources 4. In at least some of these examples, the previous audio service 20_C uses user head-tracking to render head-fixed sound sources 4 via a headset 2 and the first audio service 20_1 uses user head-tracking to render head-fixed sound sources 4 not via a headset.

In some but not necessarily all examples, the continuity assessment considers impact of a change, if any, in:

spatial audio ability of the new audio rendering device 2;
new head-tracking ability;
content requirements as regards spatial audio ability and/or head-tracking ability; factors affecting audio service delivery—e.g., exterior noise, distance of user from the audio rendering device 2, ANC or pass-through capabilities.

In one example, a continuity of service exists between the previous audio service 20_C and the first audio service 20_1 because the previous audio service 20_C renders real-world fixed sound sources 4 and the first audio service 20_1 has the ability to render real-world fixed sound sources 4. The audio rendering devices 2 can be different. For example, one is a headset and the other one is not a headset, for example external speakers. The head-tracking devices 6 can be different. In the first audio service 20_C head-tracking can be performed without a headset.

In one example, a continuity of service exists between the previous audio service 20_C and the first audio service 20_1 because the previous audio service 20_C uses a first user head-tracking device and the first audio service 20_1 uses the same first user head-tracking device. The first head-tracking device 6 can be comprised in a headset 2 which can be used for audio rendering.

In one example, a continuity of service exists between the previous audio service 20_C and the first audio service 20_1 because the previous audio service 20_C renders head-fixed sound sources 4 and the first audio service 20_1 has the ability to render head-fixed sound sources 4. The audio rendering devices 2 can be different. For example, one is a headset and the other one is not a headset. The head-tracking devices 6 can be the same, for example a headset.

The first audio service 20_1 can comprises dynamic maintenance, or static set-up of:

audio focus or beamforming;
sound source width control;
ANC/passthrough with head-tracking;
spatial audio dependent on user head-tracked point-of-view.

In some examples, the plurality of audio services 20 comprises a third audio service that uses user head-tracking, and the apparatus is configured to assess the continuity of audio service by comparing a previous audio service 20_C with the first, second and third audio services to identify which of the first, second and third audio services provides a continuity of audio service with respect to the previous audio service 20_C, the apparatus 10 being configured to selectively enable the third audio service if it is assessed to provide best continuity of audio service.

Figure 7:
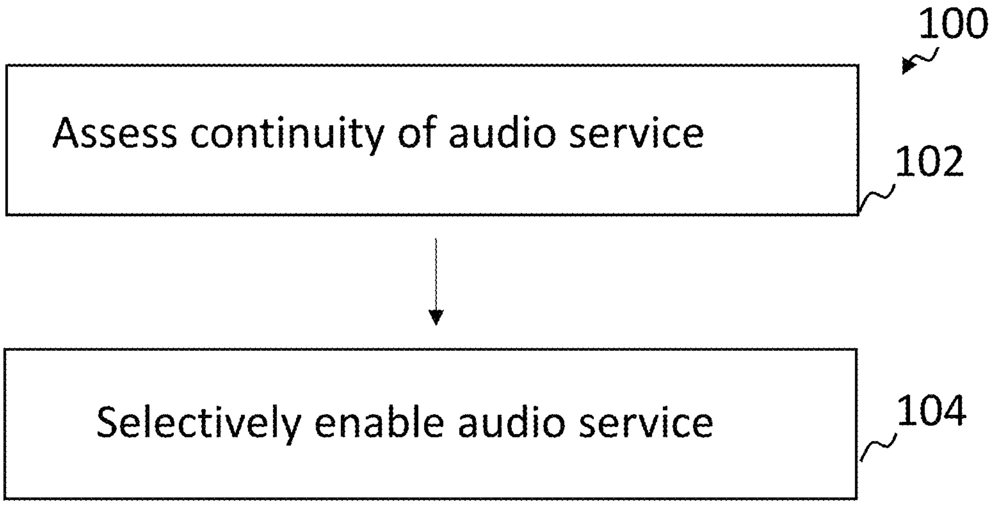
FIG. 7 illustrates a method for assessing continuity of audio services and selectively enabling audio services.

FIG. 7 illustrates an example of a method 100 for selecting an audio service.

The method 100 comprises, at block 102, assessing a continuity of audio service by comparing a previous audio service with a first spatial audio service that uses user head-tracking and a second audio service to identify which of the first spatial audio service and the second audio services provides a continuity of audio service with respect to the previous audio service.

The method 100 comprises, at block 104, selectively enabling the first spatial audio service if it is assessed to provide continuity of audio service; or selectively enabling the second audio service if it is assessed to provide continuity of audio service.

The first spatial audio service controls or sets at least one directional property of at least one sound source.

The first spatial audio service is assessed to provide continuity of audio service if it can use head-tracking to control or set the at least one directional property of at least one sound source, such that at least one directional property of at least one sound source rendered by the previous audio service is reproduced by the first spatial audio service using head-tracking.

Figure 8A:
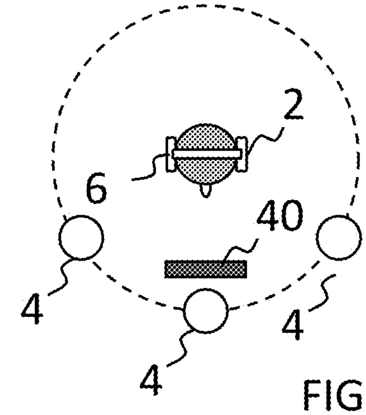
FIG. 8A, 8B, 9A, 9B illustrate examples of a first embodiment where a headset is removed and head-tracked spatial audio is maintained.
Figure 8B:
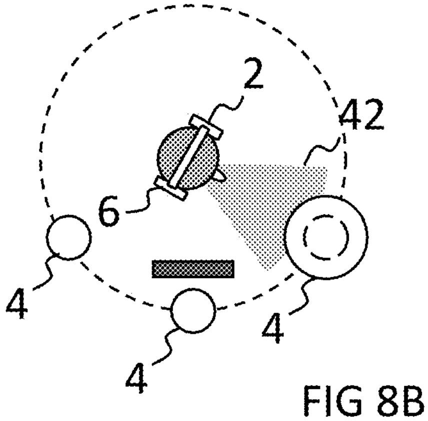
Figure 9A:
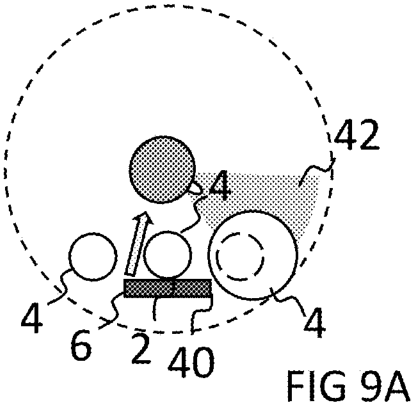
Figure 10A:
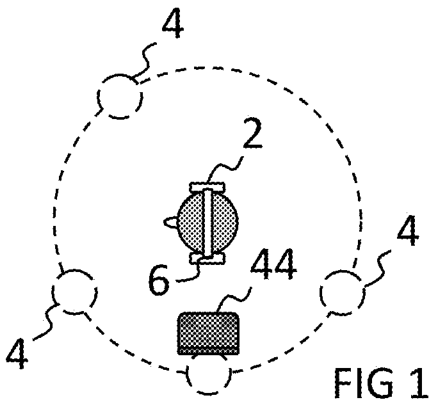
FIG. 10A, 10B, 11A, 11B illustrate other examples of the first embodiment where a headset is removed and head-tracked spatial audio is maintained.
Figure 10B:
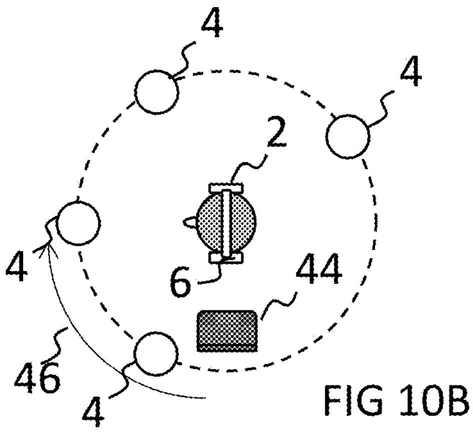
Figure 11A:
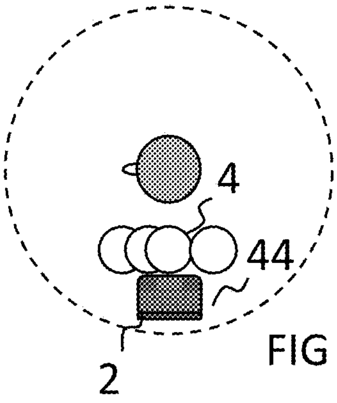

Referring to FIGS. 8A, 8B, 9A. 9B at least one directional property of at least one sound source 4 can be reproduced by the first spatial audio service using head-tracking. Referring to FIGS. 10A, 10B, 11A. 11B at least one directional property of at least one sound source 4 cannot be reproduced by the first spatial audio service using head-tracking.

The apparatus 10 (not illustrated) intelligently selects whether to continue head tracking for audio rendering by secondary means when the user removes head-tracked headset and switches audio rendering from a first audio rendering device 2 (headset) to a second audio rendering device 2 (e.g., mobile device speakers).

The apparatus 10 inspects the spatial audio content rendering scenario when switching from a first audio rendering device 2 to a second audio rendering device 2. Head tracking has been used to set or control at least one directional property associated with the first audio rendering device 2.

In a first scenario (FIGS. 8A, 8B, 9A. 9B), the apparatus 10 determines that the at least one directional property can be at least significantly reproduced with the second audio rendering device 2, and switches to secondary means of head tracking 6 to enable continuing the rendering according to the at least one directional property.

In second scenario (10A, 10B, 11A. 11B), the apparatus 10 determines that the at least one directional property cannot be reproduced properly with the second audio rendering device 2 and therefore does not switch to secondary means 6 of head tracking since continuing the rendering according to the at least one directional property does not improve the user experience over default rendering.

In FIG. 8A, a user listens to a head-tracked binaural audio over a headset 2 and watches corresponding visual content on a screen of a mobile device 40. The user detects something interesting in the audio about 40 degrees to user's left.

As illustrated in FIG. 8B, the user controls a focus beam 42 in this direction to hear the sound source 4 in this direction better. The focus beam 42 increases the intensity of sound sources 4 in the direction of the beam 42. The beam 42 can be formed in the user's current front direction and move with the user, or it can be set to that direction allowing the user to move away from that direction while still hearing the effect of the stationary beam 42. Thus, user may be able to move the beam 42 and/or preview various alternatives by further movements in the head-tracked spatial audio scene.

Continuing, in FIG. 9A, the user takes off the headset 2 (with include the head-tracking device 6), and the apparatus 10 switches to loudspeaker-based audio rendering by the mobile device 40. For example, this change reduces the immersion due to limitations of the second audio rendering device 2 (the mobile device 40). However, it is still possible to enhance certain directional properties, e.g., by applying the beam 42 which the user controls by rotating themselves relative to the sound scene. The apparatus 10 switches to camera-based head tracking 6 at the mobile device 40 and maintains the focus beam 42.

Figure 9B:
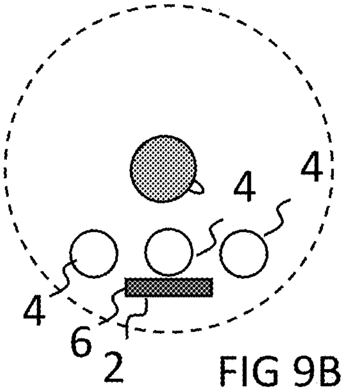

In contrast, when the method is not used as illustrated in FIG. 9B, user can rotate around as much as they wish and nothing happens.

In camera-tracked operation with the second audio rendering device 2 rendering the audio, the directional properties can be controlled according to original audio scene directions (e.g., full 3D audio) or according to a modified audio scene direction (e.g., front 180 degrees around the device).

In FIG. 10A, the user listens to a head-tracked binaural audio over a headset 2. There may be corresponding visual content on the screen of a laptop 44, however, the user is currently not interested in the visual display. In this example, the user is doing another task to the right of the laptop 44. As illustrated in FIG. 10B, the user sets a new origin for the audio scene by rotating the audio scene by a direction offset 46. This can be done, e.g., using head tracking in a separate adjustment mode. Thus, the user hears content from in front of them, although they are now rotated 90 degrees to the right. Any user rotations around this new origin can be head-tracked.

Continuing, in FIG. 11A. the user takes off the headset, and the apparatus 10 switches to loudspeaker-based audio presentation by the laptop 44. For example, this change reduces the immersion due to limitations of the second audio rendering device 2 (the laptop 44). The apparatus 10 also determines it cannot reproduce an improved audio for the user according to previous user setting based on head-tracking information: e.g., it is not possible to provide a rotated 3D sound field, since the loudspeakers are on one side of the user (here they are on the left-hand side of the user). Thus, the apparatus 10 does not resume head tracking by secondary means. The apparatus 10 determines it cannot reproduce an improved audio for the user and thus does not switch to camera-based head tracking at the laptop 44 (it only wastes power in this case).

Figure 11B:
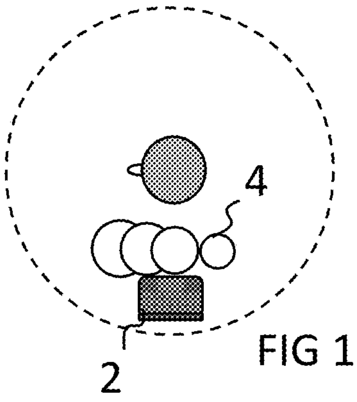

Continuing, as illustrated in FIG. 11B, in some examples the apparatus 10 can set a default modification, or offer a default modification option to the user, e.g., in terms of Left/Right balance. It could be, e.g., beneficial for user to hear a bit louder the sounds that correspond more to their front. Alternatively, the Left/Right balance could be the opposite, e.g., to allow user to hear more loudly those sounds that are otherwise behind them and partly masked, e.g., by head shape. As this can be ambiguous and depend on user preference, it is more sensible to offer this type of adjustment or modification as a user option rather than try replicating it with secondary head-tracking means.

In another example (not illustrated), there is no switch to secondary head tracking. A user is first listening to stereo-widened audio with the help of head tracking by earbuds. User then removes the earbuds. Due to too great a distance between the new audio rendering device and the user, the apparatus 10 chooses not to switch to secondary head-tracking means (e.g., camera on the mobile device). For example, the distance is too long for high-quality widening experience and the distance may also affect the reliability of the head tracking. Instead, the audio output may be made louder but without stereo widening.

Figure 12A:
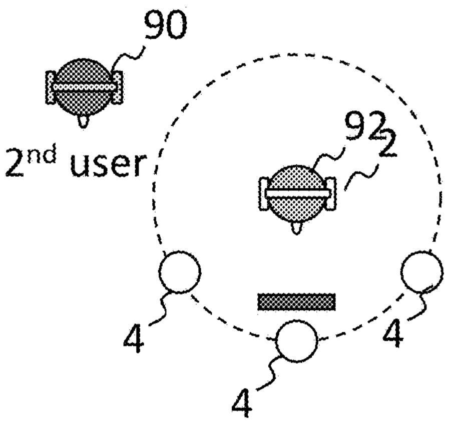
FIG. 12A, 12B, 13A, 13B, 14A, 14B illustrate examples of a second embodiment where a head-tracked spatial audio service is resumed with the same headset.
Figure 12B:
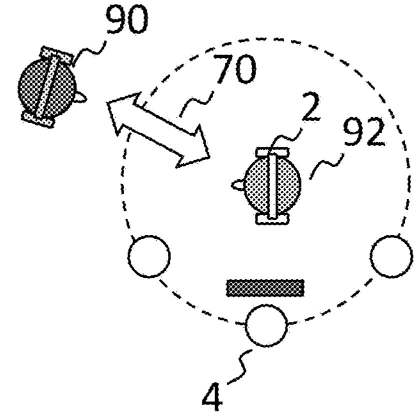
Figure 13A:
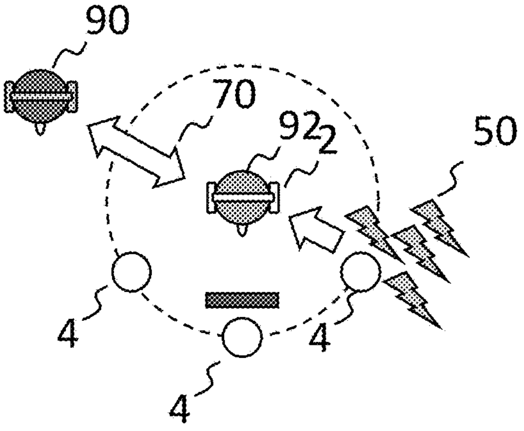
Figure 13B:
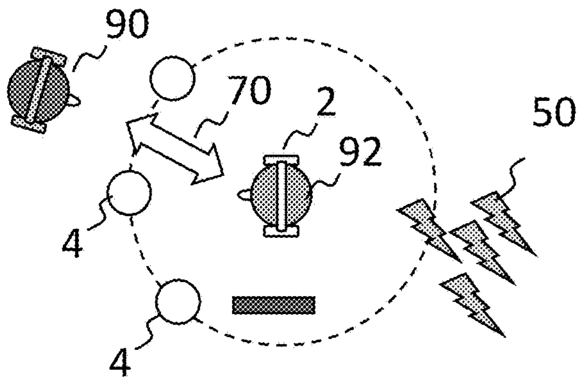

Referring to FIGS. 12A, 12B, 13A, 13B, the at least one directional property of the at least one sound source can be recalibrated and subsequently reproduced by the first spatial audio service using head-tracking (FIG. 13B). The audio scene is rotated and reproduced.

The apparatus 10 (not illustrated) intelligently selects whether to continue head tracking for audio rendering when a user resumes spatial audio playback in a different context to when user paused spatial audio playback.

The apparatus 10 inspects the spatial audio content rendering scenario and context when resuming audio playback with primary or secondary head-tracking capability, determines that head tracking has been used to set or control at least one directional property, and then based on this combination of information determines at least one of: whether to resume head tracking (with audio presentation by first or second audio device), or whether to switch to secondary means of head tracking with playback by second audio device.

Active noise cancellation (ANC), or active noise reduction (ANR), is a generally well-known technique to reduce perceived noise (unwanted sound sources) by adding soundwaves in opposite phase (i.e., destructive interference). It is achieved by a combination of at least one microphone and at least one speaker. For example, there can be microphones that capture the sounds outside and inside of an earphone, a chip for processing (inverting phase), and at least one speaker inside the earphone that thus cancels the outside sound by providing the opposite-phase audio playback. ANC processing can be a feed-forward system (mic placed on the outside of the earphone), a feed-back system (mic placed on the inside of the earphone), or a hybrid combining feed-forward and feed-back capability. ANC is typically in addition to passive noise cancellation, where the earcups or plugs keep out unwanted noises.

Hear-through or transparency mode operation is something that is different from simply turning off ANC. It can be, e.g., a selective noise cancellation, where at least some sound from the outside is played back to the user using the at least one speaker. This allows a user to, e.g., listen to audio content on their headphones and to also hear what is happening around them.

In FIG. 12A, a user 92 listens to spatial audio content with head tracking at a first location. There is a second user 90 who may also be listening to audio.

Continuing, in FIG. 12B, the two users 92, 90 wish to talk to each other, and first user 92 is utilizing transparency mode 70 to be able to hear the second user 90. The first user's spatial audio rendering exploits head tracking in order to provide the most immersive audio experience. After some time, the first user 92 pauses the content consumption.

Continuing, in FIG. 13A or 14A, the user 92 resumes the content consumption later at a second location. However, this second location differs from the first location in the sense that there is significant, fairly directional background noise 50. Thus, the content consumption context has substantially changed between pausing and resuming of the playback.

Continuing, in FIG. 13A, the user 92 has resumed playback at a new location and the second user 90 (or a different second user) is there as well. However, there is also significant background noise 50. Transparency mode 70 allows discussion between users 90, 92 but the background noise 50 would be disturbing. The apparatus 10 (not illustrated) determines that the combination of transparency mode 70 and directional background noise 50 (FIG. 13A) would make head tracking unattractive, since the user 92 is not able to hear certain direction(s) well. Thus, the apparatus 10 resumes spatial audio rendering and playback for the user 92 without head tracking (FIG. 13B).

Continuing, in FIG. 13B, the user 92 is able to turn the spatial audio scene by looking away from the background noise source 50 and in this way enjoy the audio playback more. The user 92 is also able to discuss with the second user 90 thanks to transparency mode 70. After recalibrating the origin of the sound scene by apply a rotational shift, head-tracking can in some examples be resumed.

Figure 14A:
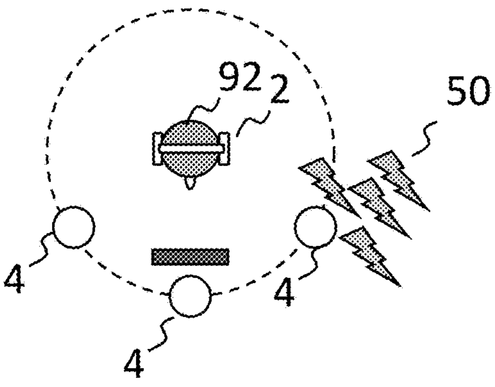
Figure 14B:
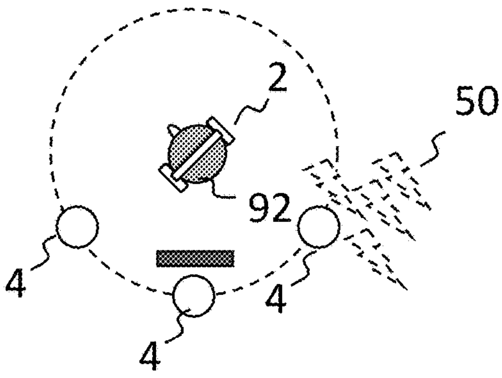

Continuing, in FIG. 14A, the user 92 resumes playback at a new location. The user 92 is now alone. However, there is now significant background noise 50. The user 92 can make use of ANC to remove the background noise 50. The apparatus 10 (not illustrated) determines that background noise 50 is not an issue when ANC is being used, since user 92 is still able to hear all directions well. Thus, as illustrated in FIG. 14B, the apparatus 10 resumes spatial audio rendering and playback with head tracking and with ANC. The user 92 does not need transparency mode and the apparatus 10 resumes head tracking for spatial audio rendering, since this provides the user 92 with the most immersive experience.

Figure 15A:
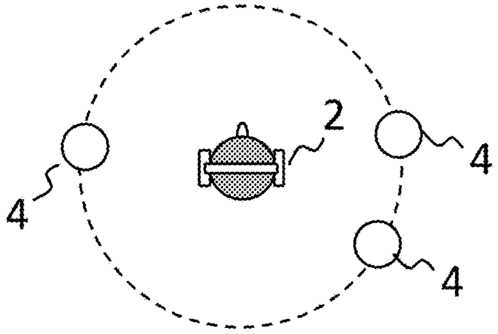
FIG. 15A, 15B illustrate an example of a third embodiment where a spatial audio service is maintained with a different audio rendering device.
Figure 15B:
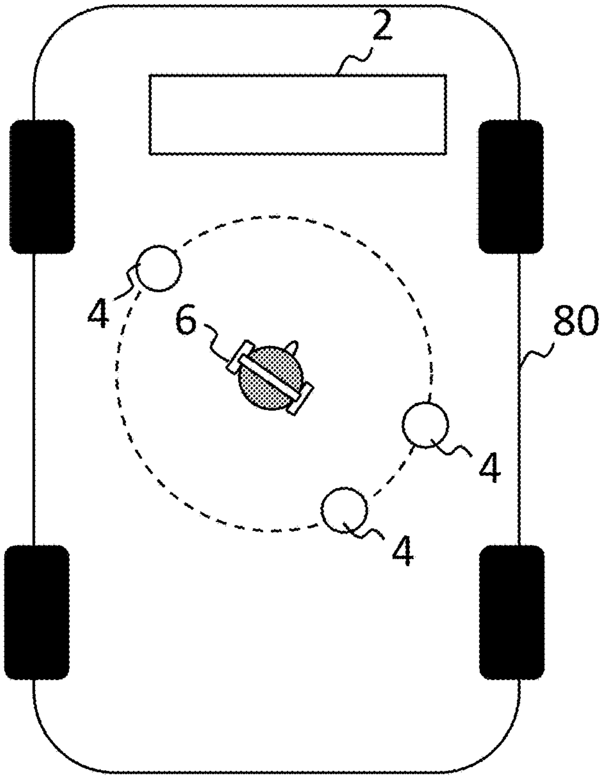

Referring to FIGS. 15A, 15B a fixed directional property of the at least one sound source can be reproduced by the first spatial audio service using head-tracking. In this example, the fixed directional property is the orientation of the sound scene relative to the user's head.

The apparatus 10 (not illustrated) inspects the spatial audio content rendering scenario:

when switching from a first audio device to a second audio device, or when switching from a first audio playback scenario to a second audio playback scenario, determines that no head tracking has been used prior to the switch, and decides whether to begin using head tracking (potentially switching to a secondary means of head tracking) in order to maintain at least one spatial audio property of the rendering prior to the switching. This can maintain maintains the original spatial audio experience.

In this example a device hands over from non-head-tracked headset playback (FIG. 15A) to loudspeaker rendering, e.g., car surround loudspeakers (FIG. 15B). In this case the headset head tracking (FIG. 15B) is used to provide similar non-head-tracked experience and sound sources will rotate with head rotation. The same approach to device handover can be applied if the vehicle/device has a head-tracking device 6 e.g. a camera and capability of tracking user's head movement.

In FIG. 15A, a user listens to spatial audio content that is not head tracked. For example, this can be music or legacy stereo content (that may still be, e.g., binauralized).

Continuing, in FIG. 15B, the user enters their car 80 and audio playback is switched from the first audio rendering device 2 (headset) to the second audio rendering device 2 (car's surround loudspeaker system). The loudspeaker system creates a "natural head tracking", i.e., sounds stay in their places regardless of head rotation thus the user can rotate their head and the sound is still heard from its original direction (since it is played back by the loudspeaker(s)).

However, in this example, this is not a preferred outcome. If the user has, e.g., specifically requested that audio playback does not compensate for head rotation (on headphones that have this capability), this can be desired outcome also in other cases. Thus, head tracking (by use of, e.g., the headset worn by user with transparency mode activated; or by, e.g., camera-based tracking using the car system) is activated and it is used to move the audio with user's head using loudspeakers—the user's head movement are taken into account by rotating the audio scene with the user's head.

This provides a continuity of experience with before entering the car 80.

When the content rendering option is changed from head tracking not preferred to head tracking preferred, the audio can be played by the loudspeakers 2 without the help of head-tracking.

The sounds generated by the car system (e.g., parking radar sounds) are played back from their default directions, i.e., they do not take into account the user's head rotation. Thus, the user may better differentiate them from the rendered spatial audio content.

Figure 16:
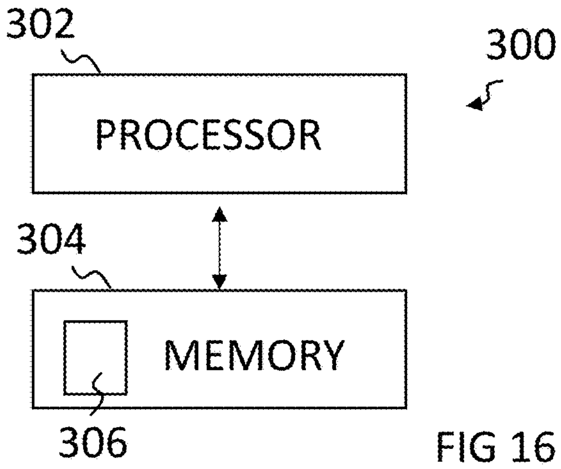
FIG. 16 illustrates an example of a controller for an apparatus.

FIG. 16 illustrates an example of a controller 300 suitable for use in the apparatus 10. Implementation of a controller 300 may be as controller circuitry. The controller 300 may be implemented in hardware alone, have certain aspects in software including firmware alone or can be a combination of hardware and software (including firmware).

As illustrated in FIG. 16 the controller 300 may be implemented using instructions that enable hardware functionality, for example, by using executable instructions of a computer program 306 in a general-purpose or special-purpose processor 302 that may be stored on a computer readable storage medium (disk, memory etc) to be executed by such a processor 302.

The processor 302 is configured to read from and write to the memory 304. The processor 302 may also comprise an output interface via which data and/or commands are output by the processor 302 and an input interface via which data and/or commands are input to the processor 302.

The memory 304 stores a computer program 306 comprising computer program instructions (computer program code) that controls the operation of the apparatus 10 when loaded into the processor 302. The computer program instructions, of the computer program 306, provide the logic and routines that enables the apparatus to perform the methods illustrated in the drawings and described herein. The processor 302 by reading the memory 304 is able to load and execute the computer program 306.

Figure 17:
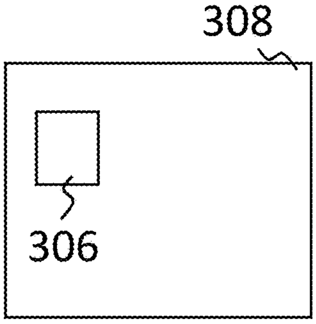
FIG. 17 illustrates an example of a computer program.

The apparatus 10 therefore comprises:

at least one processor 302; and at least one memory 304 including computer program code the at least one memory 304 and the computer program code configured to, with the at least one processor 302, cause the apparatus 10 at least to perform:

assessing a continuity of audio service by comparing a previous audio service with a first spatial audio service that uses user head-tracking and a second audio service to identify which of the first spatial audio service and the second audio services provides a continuity of audio service with respect to the previous audio service;

selectively enabling the first spatial audio service if it is assessed to provide continuity of audio service;

selectively enabling the second audio service if it is assessed to provide continuity of audio service, wherein the first spatial audio service controls or sets at least one directional property of at least one sound source and wherein the first spatial audio service is assessed to provide continuity of audio service if it can use head-tracking to control or set the at least one directional property of at least one sound source, such that at least one directional property of at least one sound source rendered by the previous audio service is reproduced by the first spatial audio service using head-tracking As illustrated in FIG. 17, the computer program 306 may arrive at the apparatus 10 via any suitable delivery mechanism 308. The delivery mechanism 308 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid-state memory, an article of manufacture that comprises or tangibly embodies the computer program 306. The delivery mechanism may be a signal configured to reliably transfer the computer program 306. The apparatus 10 may propagate or transmit the computer program 306 as a computer data signal.

Computer program instructions for causing an apparatus to perform at least the following or for performing at least the following:

assessing a continuity of audio service by comparing a previous audio service with a first spatial audio service that uses user head-tracking and a second audio service to identify which of the first spatial audio service and the second audio services provides a continuity of audio service with respect to the previous audio service;

selectively enabling the first spatial audio service if it is assessed to provide continuity of audio service;

selectively enabling the second audio service if it is assessed to provide continuity of audio service, wherein the first spatial audio service controls or sets at least one directional property of at least one sound source and wherein the first spatial audio service is assessed to provide continuity of audio service if it can use head-tracking to control or set the at least one directional property of at least one sound source, such that at least one directional property of at least one sound source rendered by the previous audio service is reproduced by the first spatial audio service using head-tracking.

The computer program instructions may be comprised in a computer program, a non-transitory computer readable medium, a computer program product, a machine readable medium. In some but not necessarily all examples, the computer program instructions may be distributed over more than one computer program.

Although the memory 304 is illustrated as a single component/circuitry it may be implemented as one or more separate components/circuitry some or all of which may be integrated/removable and/or may provide permanent/semi-permanent/dynamic/cached storage.

Although the processor 302 is illustrated as a single component/circuitry it may be implemented as one or more separate components/circuitry some or all of which may be integrated/removable. The processor 302 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the drawings may represent steps in a method and/or sections of code in the computer program 306. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

The above-described examples find application as enabling components of: automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising:

at least one processor; and at least one memory including computer program code, the at least one memory and the computer program code configured to, with the at least one processor, cause the apparatus at least to perform:

assessing a continuity of audio service by comparing a previous audio service with a first spatial audio service that uses user head-tracking and a second audio service to identify which of the first spatial audio service and the second audio service provides a continuity of audio service with respect to the previous audio service;

selectively enabling the first spatial audio service if it is assessed to provide continuity of audio service; and selectively enabling the second audio service if it is assessed to provide continuity of audio service, wherein the first spatial audio service controls or sets at least one directional property of at least one sound source and wherein the first spatial audio service is assessed to provide continuity of audio service if it can use head-tracking to control or set the at least one directional property of at least one sound source, such that at least one directional property of at least one sound source rendered by the previous audio service is reproduced by the first spatial audio service using head-tracking.

2. An apparatus as claimed in claim 1, wherein the previous audio service is a spatial audio service that uses head-tracking to control or set at least one directional property of at least one sound source and the first spatial audio service is assessed to provide continuity of audio service if it can use head-tracking to control or set the at least one directional property of the at least one sound source such that the at least one directional property of the at least one sound source can be reproduced by the first spatial audio service using head-tracking.

3. An apparatus as claimed in claim 1, wherein continuity of service is assessed to exist between the previous audio service and the first audio service when the previous audio service uses user head-tracking to render real-world-fixed sound sources and the first audio service uses user head-tracking to render real-world-fixed sound sources.

4. An apparatus as claimed in claim 3, wherein the previous audio service uses user head-tracking to render real-world-fixed sound sources via a headset and the first audio service uses user head-tracking to render real-world-fixed sound sources not via a headset.

5. An apparatus as claimed in claim 1, wherein the previous audio service is a spatial audio service that uses head-tracking to control or set at least one directional property of at least one sound source and the first spatial audio service is assessed to provide continuity of audio service if it can use head-tracking to control or set the at least one directional property of the at least one sound source, wherein the at least one directional property of the at least one sound source can be recalibrated and subsequently reproduced by the first spatial audio service using head-tracking.

6. An apparatus as claimed in claim 1, wherein the previous audio service is not a spatial audio service that does not use head-tracking and has a fixed directional property of at least one sound source and the first spatial audio service is assessed to provide continuity of audio service if it can use head-tracking to control or set at least one directional property of the at least one sound source, wherein the fixed directional property of the at least one sound source can be reproduced by the first spatial audio service using head-tracking.

7. An apparatus as claimed in claim 1, wherein continuity of service is assessed to exist between the previous audio service and the first audio service when the previous audio service renders head-fixed sound sources and the first audio service uses user head-tracking to render head-fixed sound sources.

8. An apparatus as claimed in claim 7, wherein the previous audio service uses user head-tracking to render head-fixed sound sources via a headset and the first audio service uses user head-tracking to render head-fixed sound sources not via a headset.

9. An apparatus as claimed in claim 1, wherein continuity of service exists between the previous audio service and the first audio service when the previous audio service uses a first user head-tracking device and the first audio service uses the same first user head-tracking device.

10. An apparatus as claimed in claim 9 wherein the first head-tracking device is comprised in or uses a headset.

11. An apparatus as claimed in claim 1, wherein the first audio service and the second audio service use different audio output devices, one of which is a headset and the other one of which is not a headset.

12. An apparatus as claimed in claim 1, wherein the first audio service comprises dynamic maintenance, or static set-up of:

audio focus or beamforming;

sound source width control;

active noise cancellation/passthrough with head-tracking; or spatial audio dependent on user head-tracked point-of-view.

13. An apparatus as claimed in claim 1, wherein the first audio service and/or the second audio service require one or more of:

use of a headset, use of a headset for audio output, use of external speakers for audio output, use of a headset for head-tracking, or performance of head-tracking without a headset.

14. A method comprising:

assessing a continuity of audio service by comparing a previous audio service with a first spatial audio service that uses user head-tracking and a second audio service to identify which of the first spatial audio service and the second audio service provides a continuity of audio service with respect to the previous audio service;

selectively enabling the first spatial audio service if it is assessed to provide continuity of audio service; and selectively enabling the second audio service if it is assessed to provide continuity of audio service, wherein the first spatial audio service controls or sets at least one directional property of at least one sound source and wherein the first spatial audio service is assessed to provide continuity of audio service if it can use head-tracking to control or set the at least one directional property of at least one sound source, such that at least one directional property of at least one sound source rendered by the previous audio service is reproduced by the first spatial audio service using head-tracking.

15. A method as claimed in claim 14, wherein the previous audio service is a spatial audio service that uses head-tracking to control or set at least one directional property of at least one sound source and the first spatial audio service is assessed to provide continuity of audio service if it can use head-tracking to control or set the at least one directional property of the at least one sound source such that the at least one directional property of the at least one sound source can be reproduced by the first spatial audio service using head-tracking.

16. A method as claimed in claim 14, wherein continuity of service is assessed to exist between the previous audio service and the first audio service when the previous audio service uses user head-tracking to render real-world-fixed sound sources and the first audio service uses user head-tracking to render real-world-fixed sound sources.

17. A method as claimed in claim 16, wherein the previous audio service uses user head-tracking to render real-world-fixed sound sources via a headset and the first audio service uses user head-tracking to render real-world-fixed sound sources not via a headset.

18. A method as claimed in claim 14, wherein the previous audio service is a spatial audio service that uses head-tracking to control or set at least one directional property of at least one sound source and the first spatial audio service is assessed to provide continuity of audio service if it can use head-tracking to control or set the at least one directional property of the at least one sound source, wherein the at least one directional property of the at least one sound source can be recalibrated and subsequently reproduced by the first spatial audio service using head-tracking.

19. A method as claimed in claim 14, wherein the previous audio service is not a spatial audio service that does not use head-tracking and has a fixed directional property of at least one sound source and the first spatial audio service is assessed to provide continuity of audio service if it can use head-tracking to control or set at least one directional property of the at least one sound source, wherein the fixed directional property of the at least one sound source can be reproduced by the first spatial audio service using head-tracking.

20. A non-transitory computer-readable storage medium storing a computer program that when run on one or more processors of an apparatus causes the apparatus to perform:

assessing a continuity of audio service by comparing a previous audio service with a first spatial audio service that uses user head-tracking and a second audio service to identify which of the first spatial audio service and the second audio service provides a continuity of audio service with respect to the previous audio service;

selectively enabling the first spatial audio service if it is assessed to provide continuity of audio service; and selectively enabling the second audio service if it is assessed to provide continuity of audio service, wherein the first spatial audio service controls or sets at least one directional property of at least one sound source and wherein the first spatial audio service is assessed to provide continuity of audio service if it can use head-tracking to control or set the at least one directional property of at least one sound source, such that at least one directional property of at least one sound source rendered by the previous audio service is reproduced by the first spatial audio service using head-tracking.

* * * * *